Figure 4:
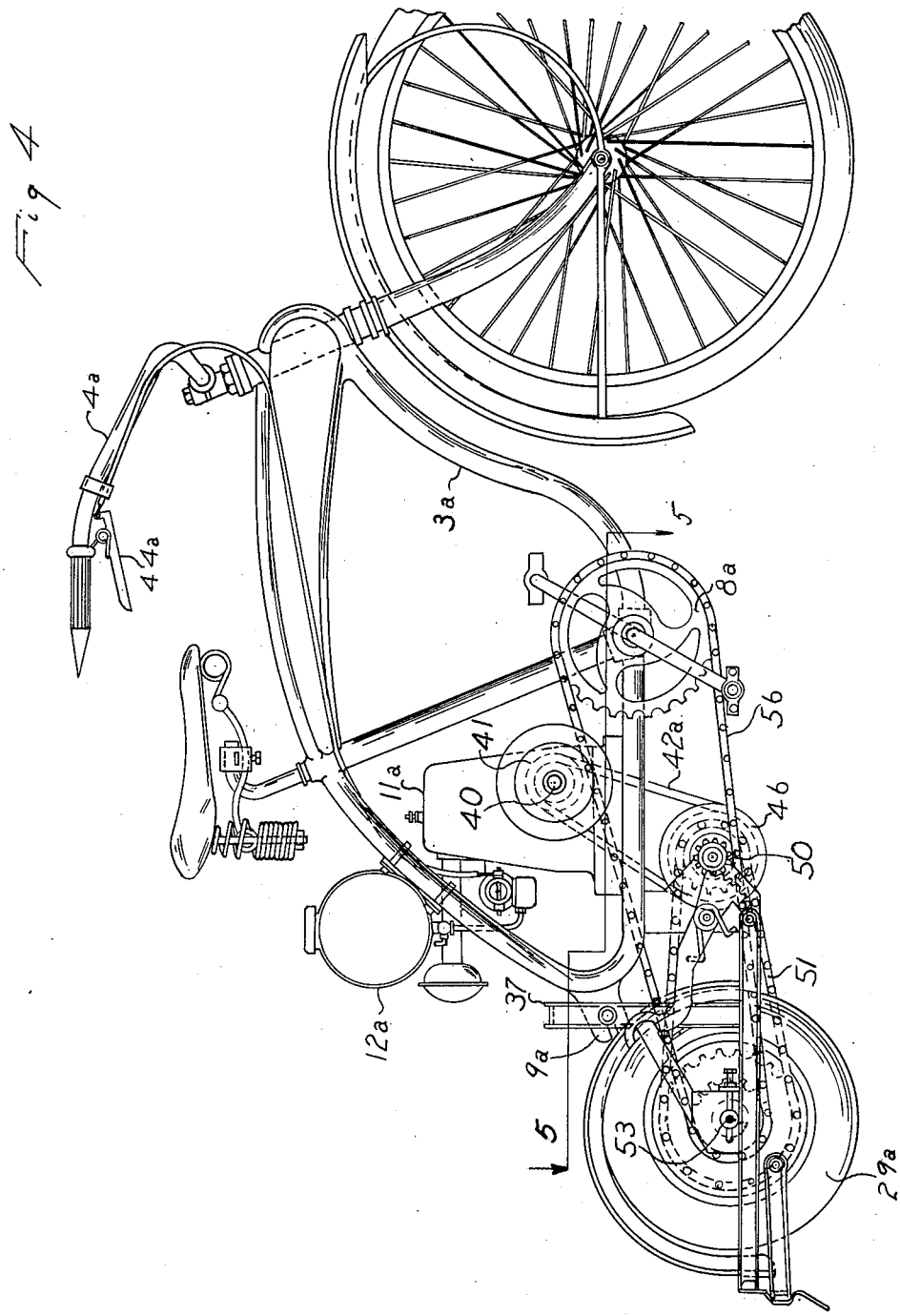

Oct. 19, 1943.   T. G. HARE   2,331,976
MOTORCYCLE
Filed Sept. 17, 1941   4 Sheets-Sheet 1
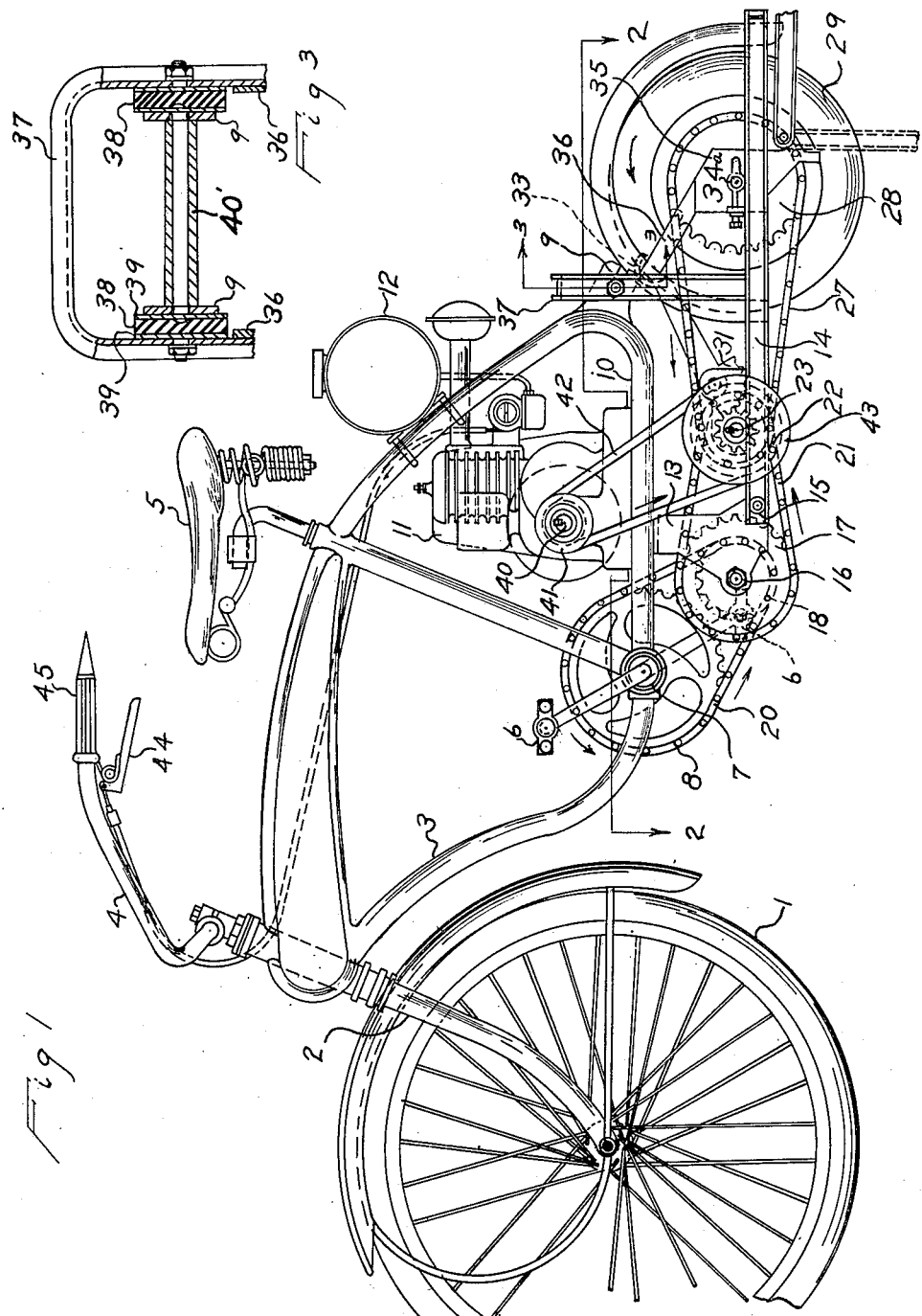
INVENTOR.
TERENCE G. HARE
BY
Windsor Davis
ATTORNEY Oct. 19, 1943.   T. G. HARE   2,331,976
MOTORCYCLE
Filed Sept. 17, 1941   4 Sheets-Sheet 2
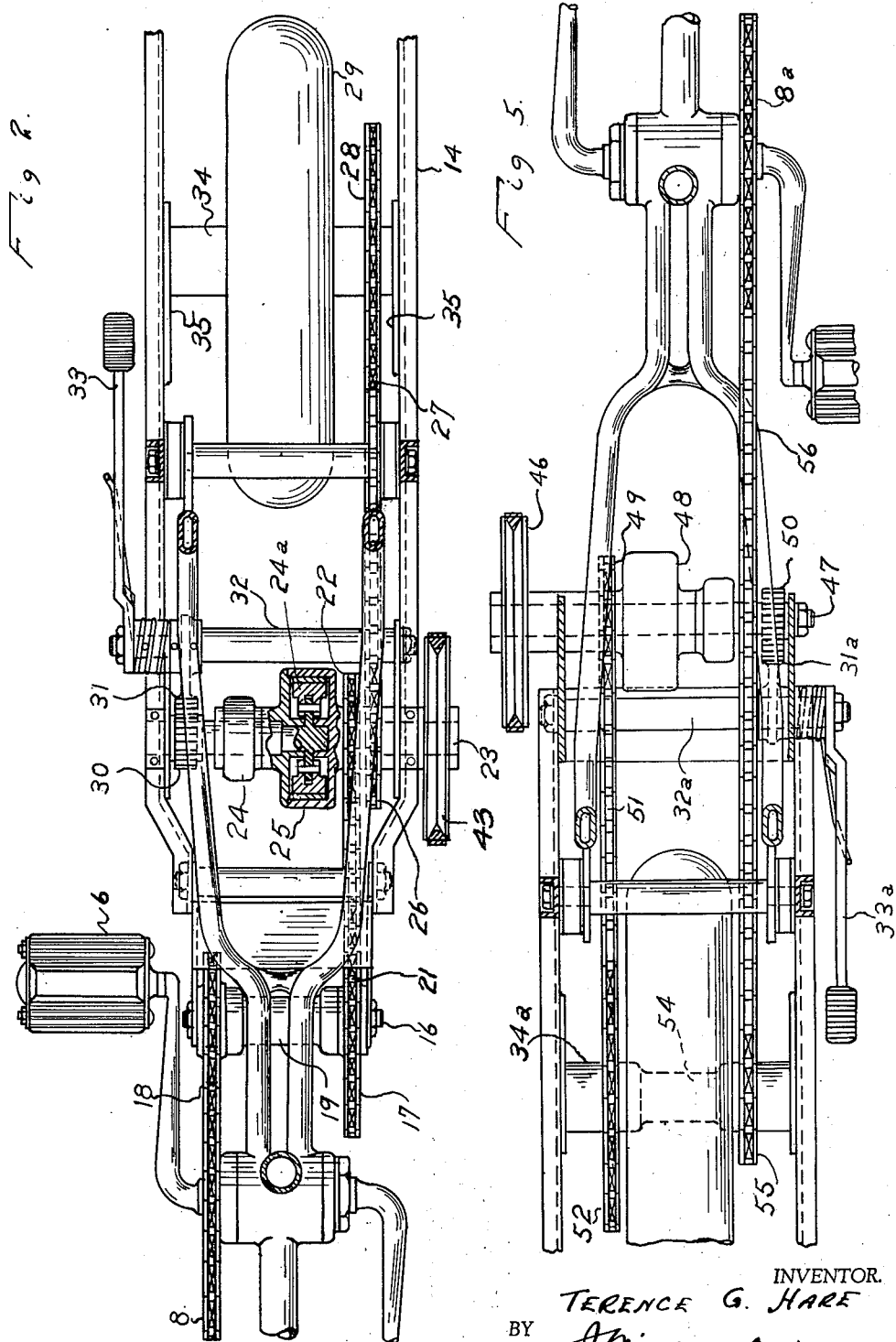
INVENTOR.
TERENCE G. HARE
BY
ATTORNEY Oct. 19, 1943.   T. G. HARE   2,331,976
MOTORCYCLE
Filed Sept. 17, 1941   4 Sheets-Sheet 3

INVENTOR.
TERENCE G. HARE
BY
ATTORNEY

Oct. 19, 1943.  T. G. HARE  2,331,976
MOTORCYCLE
Filed Sept. 17, 1941  4 Sheets-Sheet 4
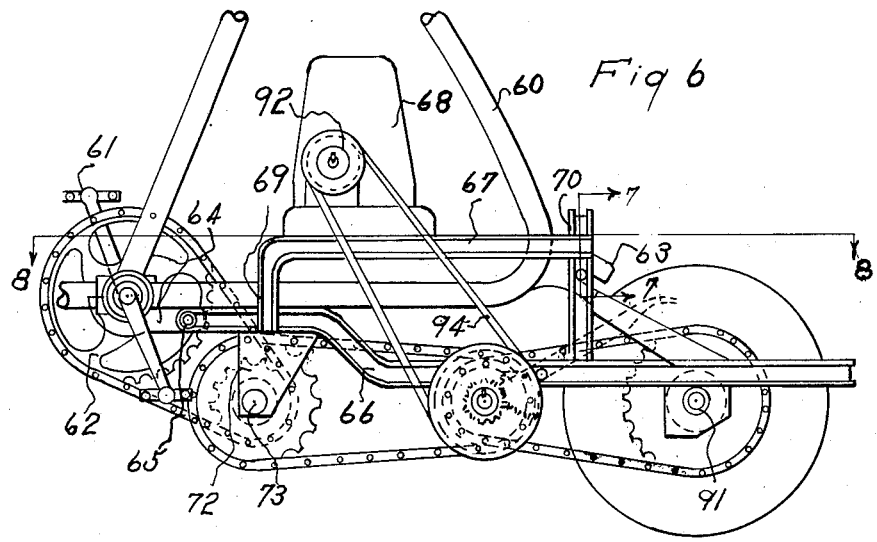
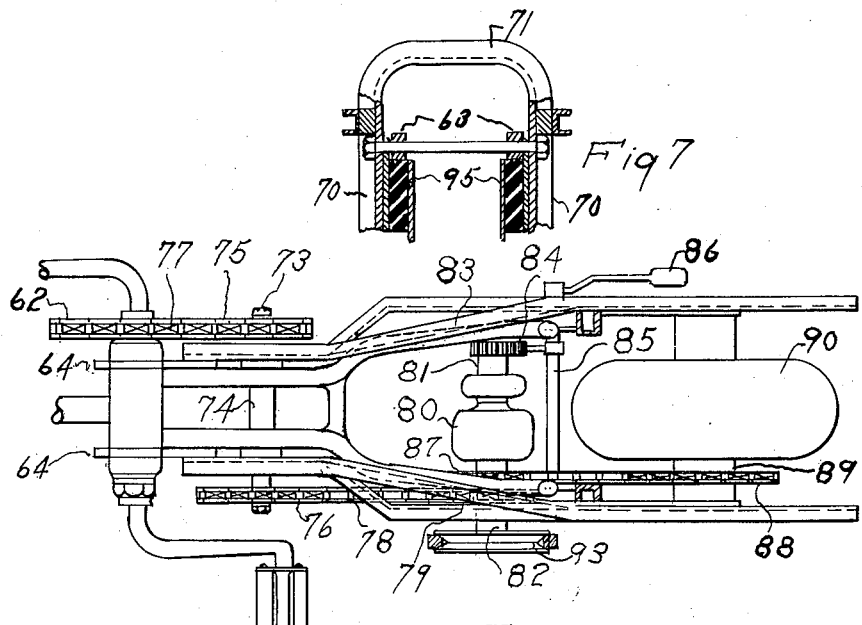
INVENTOR.
TERENCE G. HARE
BY
ATTORNEY Patented Oct. 19, 1943

2,331,976

UNITED STATES PATENT OFFICE 2,331,976

MOTORCYCLE

Terence G. Hare, Ypsilanti, Mich., assignor to The Amesbury Seat Manufacturing Co., Ypsilanti, Mich., a corporation of Michigan Application September 17, 1941, Serial No. 411,251

10 Claims. (Cl. 180—33)

This invention relates to self-propelled vehicles and particularly to two or three-wheeled vehicles of the so-called motor-bicycle or motor-cycle type.

A principal object of the invention is to provide a motor-bicycle having a two-part frame with the parts articulated in such manner that a spring suspension supports the rider and motor with respect to the rear wheel and, correlatively, so that the rear wheel represents the total weight for which the rear tire is called upon to act as the sole springing medium.

Another main object of the invention is to provide a bicycle type of vehicle having a motor carried thereby in combination with pedals so connected and arranged that the rider may help along the motor at any time when he can rotate the pedals at a speed greater than the rotative speed of the rear wheel. Thus, when climbing a hill which the motor is incapable of pulling or at any time when the motor begins to labor the rider may add the power of his own pedalling to that of the motor.

Another object is to provide a power frame and wheel assembly which can be applied to a conventional bicycle by replacing the conventional rear wheel without altering the frame thereof. Thus, a manufacturer of bicycles will be able to use his present tools and the power units may be distributed to and installed by bicycle retail and repair concerns.

A further object is to provide simplified controls for the vehicle, these controls consisting essentially in a throttle at the hand of the rider which controls the centrifugal clutch by regulating the speed of the motor. The coaster brake ordinarily found on a bicycle is retained, or provided if none is present. In one form illustrated the coaster brake occupies a separate shaft and in the other form it is installed in the rear wheel which forms a part of the power unit. The advantages of the former is that it facilitates the changing of the rear tire and the advantage of the latter is that it permits of a smaller and hence cheaper frame.

A further object is to provide a heavy auxiliary frame and sturdy rear wheel in order that the cycle may be able to carry loads substantially in excess of that of an ordinary bicycle. An auxiliary seat or package carrier may thus be added.

Another object is to provide a powered bicycle including a separate sub-frame through which motor torque is transmitted so that the original frame is not submitted to stresses for which it was not intended.

The vehicle is thus very light in weight with all of the advantages of a "scooter bike," but with the disadvantages replaced by the advantages of a bicycle.

Other objects and advantages will become more fully apparent as reference is had to the accompanying drawings wherein my invention is illustrated, and in which Fig. 1 is a side elevation of the complete vehicle with my invention incorporated therein, Fig. 2 is a horizontal section taken along the line 2—2 of Fig. 1, Fig. 3 is a detail showing the spring suspension taken along the line 3—3 of Fig. 1, Fig. 4 is a side elevation of a complete vehicle showing the embodiment of a modification of my invention, Fig. 5 is a horizontal section taken along the line 5—5 of Fig. 4.

Fig. 6 is a side elevation of a modification of my improved power unit applied to a bicycle frame illustrated fragmentarily, Fig. 7 is a detail section taken along the line 7—7 of Fig. 6, and Fig. 8 is a horizontal section taken along the line 8—8 of Fig. 6.

More particularly, 1 indicates the front wheel which is journalled in the forks 2 of a bicycle frame 3. The forks 2 are steered by the handle bars 4 and the frame is equipped with a seat 5. Two pedals 6 are connected by a shaft which is journalled in the frame at 7 and the shaft carries a sprocket wheel 8 which is keyed thereto. To this point the structure is that of a conventional bicycle.

Extending rearwardly from the lower rear corners of the frame 3 are small forked brackets 9 which were intended for reception of the rear wheel axle unit, but which are used for attachment of the power frame to the frame 3 as will now be described.

The lower horizontal parts of the frame 3 which originally formed the rear wheel fork are indicated by the numeral 10. Resting on these parts is the motor 11, preferably of the single cylinder gasoline type, having a fuel tank 12 secured to the frame 3 at an adjacent convenient point, as illustrated. Depending from the members 10 are extension ears or brackets 13 to the lower end of which the auxiliary frame 14 is pivotally attached by the bolt 15.

Journalled in the front end of the bracket 13 is a shaft 16 which carries two sprocket wheels 17 and 18 and also the coaster brake assembly 19. The sprocket wheel 18 has a sprocket chain 20 which engages the sprocket wheel 8 and may, therefore, be driven by the pedals 6. The coaster brake 19 is not shown in detail since it is convenient to use the exact type as is conventional for bicycles. The sprocket wheel 17 has a sprocket chain 21 which engages a sprocket wheel 22 keyed to the free part 25 of a centrifugal clutch. This part 25 together with the sprocket wheel 22 is freely rotatably on a shaft 23 subject to the centrifugal clutch as will be hereinafter described.

Coaxial with the clutch part 25 is a second clutch part 24 which is fixedly secured to the shaft 23 for rotation therewith. It may be of conventional construction in which the weights 24a fly outwardly under centrifugal force thus causing frictional engagement with the clutch part 25. Also keyed to the free clutch part 25 is a sprocket wheel 26 having a sprocket chain 27 which engages a sprocket wheel 28 coaxial with the rear wheel 29 and keyed to the hub 34 thereof. The shaft 23 has a starter gear 30 keyed thereto which engages a gear segment 31 which is keyed to a shaft 32 upon the outer end of which a starter pedal 33 is mounted.

The hub 34 is freely rotatable on an axle 34a which is secured to the brackets 35, each of which is fixedly secured to the frame 14 and terminates in a forwardly inclined portion 36. Also fixedly secured to the frame 14 is a U-shaped top frame member 37 which overpasses the brackets 9 and to which the bracket extensions 36 may be welded or otherwise secured. In order to attach the brackets 9 to the frame member 37, I provide resilient elements preferably in the form of blocks of rubber 38 to each side of each of which metallic plates 39 are surface bonded. One of the plates 39 of each element is fixedly secured to the frame member 37, as illustrated in Fig. 3, and the other plate of each element is fixedly secured to one of the brackets 9. A spacer rod 40' is interposed to render stability and to maintain the rubber under some initial compression.

In operation it will be seen that if the main frame 3 with the seat 5 is loaded, or in case of a sudden upward movement of the wheel 29 under a road impact, that the rubber springs 38 will yield under shear stresses thus springing the main frame and seat with respect to the rear wheel. It will be seen that the motor 11 is also sprung with the main frame 3 and with respect to the rear wheel, the motor torque being transmitted from its crankshaft 40 through a pulley 41 thereon to a belt 42 and thence to a second pulley 43 keyed to the shaft 23.

Thus when the motor 11 is started by kicking the pedal 33 the crankshaft 40 rotates the pulleys 41 and 43 together with the shaft 23. A throttle 44, convenient to the grips 45 of the handle bars 4, is used to control the engine speed and when the engine speeds up enough to cause the weights 24a to fly outwardly, the clutch parts 24 and 25 engage thus driving the sprocket wheels 22 and 26 so that the vehicle moves off under the power of the motor. The sprocket 22 rotates the chain 21 and sprocket wheel 17, but the sprocket wheel 18 and the pedals 6 do not rotate because they are connected thereto through the coaster brake 19. However, in initiating propulsion or at any time during operation the rider may rotate the pedals and if the rotation imparted to the sprocket wheel 18 is faster than the rotation of the sprocket wheel 17 by the motor his effort will be added to that of the motor. In slowing down or in coming to a stop the rider merely releases his grip on the throttle 44 and places pressure on his pedals in reverse direction, whereupon the coaster brake 19 will retard the travel of the sprocket chains 21 and 27 thus retarding the rotation of the rear wheel 29.

Figs. 4 and 5 are similar to Figs. 1 and 2 so that similar numerals with small "a" will be understood to correspond exactly to parts bearing the same numerals.

In this case the belt 42a from the motor 11a overpasses a pulley 46 mounted on a shaft 47, composed of two coaxial parts. A centrifugal clutch 48 is coaxial with this shaft and is composed of one part fixed thereto and another part freely rotatable on the shaft 47, as previously described. The free part of the clutch has a sprocket wheel 49 keyed thereto and keyed to the other part of the clutch is a starter gear 50. The sprocket wheel 49 engages a sprocket chain 51 which engages a sprocket wheel 52 keyed to the hub 34a of the rear wheel 29a. The gear 50 engages a gear sector 31a mounted on a shaft 32a and rotatable by means of a starter pedal 33a.

The rear axle 53 carries the coaster brake 54 in the manner of a conventional bicycle, a sprocket wheel 55 being provided for direct connection of the wheel hub 34a to the pedal sprocket wheel 8a by means of a sprocket chain 56.

In this case no springs are shown between the brackets 9a and the frame parts 37a. They may, therefore, be omitted in the interests of economy whereupon the brackets 9a will be bolted direct to the sides of the member 37, or the springs may be included in the interests of better riding quality and longer life of the sprung parts.

Referring now to Figs. 6, 7 and 8, these figures illustrate a modification in which the power unit is composed of the rear wheel, frame and motor complete and ready for attachment to a bicycle upon removal of the rear wheel and provision of a bracket as will be described. The advantage of this form is that neither the motor nor any other part must be separately assembled by the purchaser or by the dealer.

The usual bicycle frame 60 is equipped with pedals 61 which may rotate a sprocket wheel 62. A pair of brackets 63 are forked to receive the axle of a rear wheel, the rear wheel and axle having been removed for the installation of my power unit.

Brackets 64 are provided for attachment adjacent the axis of the sprocket wheel 62 and is for the purpose of pivotal attachment at 65 of the power unit frame 66 thereto. Fixedly secured to the frame 66 and constituting a part thereof is a platform portion 67 upon which the engine 68 is mounted. The portion 67 is connected to the frame 66 by the uprights 69 at its front end and by uprights 70 at its rear end, the uprights 70 being joined at their top by the portion 71 which forms a U-member therewith.

Depending from the frame 66 towards its front end is a pair of brackets 72 in which a shaft 73 is mounted. This shaft carries a coaster brake 74 on one part of which a sprocket wheel 75 is keyed and on the other part of which a sprocket wheel 76 is keyed. The wheel 75 is connected to the sprocket wheel 62 by a sprocket chain 77 for rotation of the wheel 75 by the pedals 61.

The wheel 76 has a sprocket chain 78 in engagement therewith and which also engages a sprocket wheel 79 which is keyed to the free part 80 of a centrifugal clutch. The other part 81 of the centrifugal clutch is keyed or otherwise secured to the shaft 82 which is coaxial with the clutch parts 80 and 81 and with the sprocket wheel 79.

Also mounted on the clutch part 81 is a starter gear 83 which engages a gear segment 84 mounted on a shaft 85 which, in turn, is rotatable by means of a starter pedal 86.

Also keyed to the free member 80 of the centrifugal clutch is a sprocket wheel 87 having a sprocket chain thereover which also engages a sprocket wheel 88 secured to the hub 89 of the rear wheel 90. The hub and wheel are rotatable on the axle 91.

The motor 68 has a pulley 92 on the end of its crank shaft and the shaft 82 has a pulley 93 keyed thereto. A belt 94 connects these pulleys so that the motor drives the rear wheel 90, the pedals 61 being also able to add the effort of pedaling to that of the motor as previously described.

In order to spring this power unit from the main frame 60 I interpose the springs 95 between the uprights 70 and the brackets 63.

Various other modifications will suggest themselves to those skilled in the art and I desire to be extended protection as defined by the appended claims.

What is claimed is:

1. A sub-assembly for a power bicycle comprising an auxiliary frame adapted for attachment to the main frame of a bicycle and having a rear wheel assembled therewith, said auxiliary frame having a shaft journalled therein, a centrifugal clutch separating said shaft into two parts one of which has means associated therewith to be driven by a motor and the other of which has means associated therewith for driving said rear wheel, and a coaster brake also carried by said auxiliary frame, one part of said coaster brake being connected to said rear wheel and the other part thereof being adapted for connection to the sprocket wheel of pedals.

2. A sub-assembly for a power bicycle comprising an auxiliary frame adapted for attachment to the main frame of a bicycle and having a rear wheel assembled therewith, said auxiliary frame having two shafts journalled therein, one of said shafts including a coaster brake and having a sprocket wheel adapted for connection to the sprocket wheel of bicycle pedals and having a second sprocket for connection to said rear wheel, the other of said shafts having a clutch included therein, one side of said clutch having means associated therewith for connection to a motor, the other side of said clutch having sprocket means associated therewith for the propulsion of said rear wheel.

3. A sub-assembly for a power bicycle comprising an auxiliary frame adapted for attachment to the main frame of a bicycle and having a rear wheel assembled therewith, said auxiliary frame having two shafts journalled therein, one of said shafts including a coaster brake and having a sprocket wheel adapted for connection to the sprocket wheel of bicycle pedals and having a second sprocket for connection to said rear wheel, the other of said shafts having a clutch included therein, one side of said clutch having means associated therewith for connection to a motor, and also having a starter gear coaxial therewith and keyed thereto, the other side of said clutch having sprocket means associated therewith for the propulsion of said rear wheel, a third shaft also mounted on said auxiliary frame having a gear segment mounted thereon and engaging said starter gear, and a starter pedal mounted on said third shaft for actuation of said gear segment and said starter gear.

4. In combination with a frame of a bicycle having rotatably mounted pedals and a member driven thereby, of an auxiliary frame connected to the bicycle frame, a motor adapted to be mounted on one of the frames, a rear wheel journaled in the auxiliary frame, two power transmitting elements journaled in the auxiliary frame, means connecting one of the elements to the motor, means connecting the second of said elements to the rear wheel, a centrifugal clutch operable incident to the operation of the motor for connecting said two power transmitting elements, a third power transmitting element journaled on the auxiliary frame and operably connected to the said second power transmitting element, and means including a coaster brake for connecting said pedal driven member with the third power transmitting element.

5. In combination with a frame of a bicycle having rotatably mounted pedals and a member driven thereby, of an auxiliary frame connected to the bicycle frame, a motor adapted to be mounted on one of the frames, a rear wheel journaled in the auxiliary frame, two power transmitting elements journaled in the auxiliary frame, means connecting one of the elements to the motor, means connecting the second of said elements to the rear wheel, a clutch operable to connect and disconnect said two power transmitting elements, a third power transmitting element journaled on the auxiliary frame and operably connected to the said second power transmitting element, and means including a coaster brake for connecting said pedal driven member with the third power transmitting element.

6. In combination with a frame of a bicycle having rotatably mounted pedals and a member driven thereby, of an auxiliary frame connected to the bicycle frame, a motor adapted to be mounted on one of the frames, a rear wheel journaled in the auxiliary frame and having a hub, two power transmitting elements journaled in the auxiliary frame, means connecting one of the elements to the motor, means connecting the second of said elements to the rear wheel through its hub, a clutch operable to connect and disconnect said two power transmitting elements, a third power transmitting element and means including a coaster brake for operably connecting the pedal driven member and the said rear wheel through the said third power transmitting element.

7. In combination with a frame of a bicycle having rotatably mounted pedals and a member driven thereby, of an auxiliary frame connected to the bicycle frame, a motor mounted upon the bicycle frame, a rear wheel journaled in the auxiliary frame and having a hub, two power transmitting elements journaled in the auxiliary frame, means connecting one of the elements to the motor, means connecting the second of said elements to the rear wheel through its hub, a clutch operable to connect and disconnect said two power transmitting elements, a third power transmitting element and means including a coaster brake for operably connecting the pedal driven member and the said rear wheel through said third power transmitting element.

8. A subassembly for a bicycle having rotatably mounted pedals and a member driven thereby, comprising an auxiliary frame adapted to be connected to the bicycle frame, a motor adapted to be mounted upon one of the frames, a rear wheel journaled in the auxiliary frame, two power transmitting elements journaled in the auxiliary frame, one of said power transmitting elements being adapted to be connected to the motor, means connecting the second power transmitting element to the rear wheel, a clutch operable by the rotation of the motor for connecting and disconnecting said two power transmitting elements, a third power transmitting element journaled in the auxiliary frame and operably connected to the said second power transmitting element, and means on the auxiliary frame including a coaster brake operably associated with the said third power transmitting means and adapted for connection to the pedal driven member.

9. A subassembly for a bicycle having rotatably mounted pedals and a member driven thereby, comprising an auxiliary frame adapted to be connected to the bicycle frame, a motor adapted to be mounted upon one of the frames, a rear wheel journaled in the auxiliary frame, two power transmitting elements journaled in the auxiliary frame, one of said power transmitting elements being adapted to be connected to the motor, means connecting the second power transmitting element to the rear wheel, a clutch operable to connect and disconnect the said two power transmitting elements, a third power transmitting element journaled in the auxiliary frame and operably connected to the said second power transmitting element, and means on the auxiliary frame including a coaster brake operably associated with the said third power transmitting element and adapted for connection to the pedal driven member.

10. A subassembly for a bicycle having rotatably mounted pedals and a sprocket therefor, comprising an auxiliary frame adapted to be connected to the bicycle frame, a motor adapted to be mounted upon one of the frames, a rear wheel journaled in the auxiliary frame, two power transmitting elements journaled in the auxiliary frame, one of said power transmitting elements being adapted to be connected to the motor, means connecting the second power transmitting element to the rear wheel, a clutch operable to connect and disconnect the said two power transmitting elements, a third power transmitting means journaled in the auxiliary frame and operably connected to the said second power transmitting element, and means on the auxiliary frame including a coaster brake structure associated with some of the power transmitting means on the auxiliary frame, said coaster brake structure having a sprocket adapted to be operably connected to the said pedal sprocket on the bicycle frame.

TERENCE G. HARE.